Figure 1:
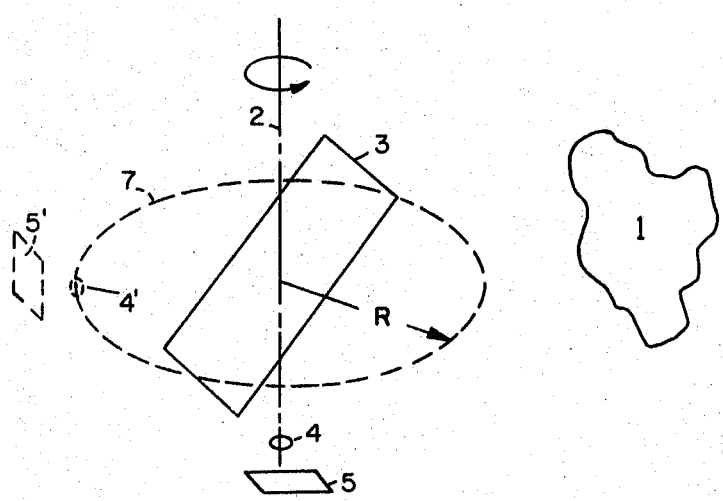

June 13, 1967 R. B. COLLENDER 3,324,760
THREE DIMENSIONAL UNAIDED VIEWING APPARATUS
Original Filed June 2, 1961 16 Sheets-Sheet 1

INVENTOR.
ROBERT B. COLLENDER
BY *Harry R. Lubcke*
AGENT

June 13, 1967  R. B. COLLENDER  3,324,760
THREE DIMENSIONAL UNAIDED VIEWING APPARATUS
Original Filed June 2, 1961  16 Sheets-Sheet 3

INVENTOR.
ROBERT B. COLLENDER
BY *Harry R. Lubcke*
AGENT

June 13, 1967 R. B. COLLENDER 3,324,760
THREE DIMENSIONAL UNAIDED VIEWING APPARATUS
Original Filed June 2, 1961 16 Sheets-Sheet 4

INVENTOR.
ROBERT B. COLLENDER
BY Harry R. Lubcke
AGENT

June 13, 1967 R. B. COLLENDER 3,324,760
THREE DIMENSIONAL UNAIDED VIEWING APPARATUS
Original Filed June 2, 1961 16 Sheets-Sheet 5

INVENTOR.
ROBERT B. COLLENDER
BY *Harry R. Lubcke*
AGENT

June 13, 1967  R. B. COLLENDER  3,324,760
THREE DIMENSIONAL UNAIDED VIEWING APPARATUS
Original Filed June 2, 1961  16 Sheets-Sheet 6

INVENTOR.
ROBERT B. COLLENDER
BY *Harry R. Lubcke*
AGENT

June 13, 1967 R. B. COLLENDER 3,324,760
THREE DIMENSIONAL UNAIDED VIEWING APPARATUS
Original Filed June 2, 1961 16 Sheets-Sheet 7

INVENTOR.
ROBERT B. COLLENDER
BY *Harry R. Lubcke*
AGENT

June 13, 1967   R. B. COLLENDER   3,324,760
THREE DIMENSIONAL UNAIDED VIEWING APPARATUS
Original Filed June 2, 1961   16 Sheets-Sheet 8

INVENTOR
ROBERT B. COLLENDER
BY *Harry R. Lubcke*
AGENT

June 13, 1967  R. B. COLLENDER  3,324,760
THREE DIMENSIONAL UNAIDED VIEWING APPARATUS
Original Filed June 2, 1961  16 Sheets-Sheet 9

INVENTOR.
ROBERT B. COLLENDER
BY Harry R. Lubcke
AGENT

June 13, 1967  R. B. COLLENDER  3,324,760
THREE DIMENSIONAL UNAIDED VIEWING APPARATUS
Original Filed June 2, 1961  16 Sheets-Sheet 10

INVENTOR.
ROBERT B. COLLENDER
BY Harry R. Lubcke
AGENT

June 13, 1967 R. B. COLLENDER 3,324,760
THREE DIMENSIONAL UNAIDED VIEWING APPARATUS
Original Filed June 2, 1961 16 Sheets-Sheet 11

INVENTOR.
ROBERT B. COLLENDER
BY Harry R. Lubcke
AGENT

June 13, 1967 R. B. COLLENDER 3,324,760
THREE DIMENSIONAL UNAIDED VIEWING APPARATUS
Original Filed June 2, 1961 16 Sheets-Sheet 12

INVENTOR.
ROBERT B. COLLENDER
BY Harry R. Lubcke
AGENT

June 13, 1967 R. B. COLLENDER 3,324,760
THREE DIMENSIONAL UNAIDED VIEWING APPARATUS
Original Filed June 2, 1961 16 Sheets-Sheet 13

INVENTOR.
ROBERT B. COLLENDER
BY *Harry R. Lubcke*
AGENT

June 13, 1967 R. B. COLLENDER 3,324,760
THREE DIMENSIONAL UNAIDED VIEWING APPARATUS
Original Filed June 2, 1961 16 Sheets-Sheet 14

*INVENTOR.*
ROBERT B. COLLENDER
BY *Harry R. Lubcke*
AGENT

June 13, 1967 R. B. COLLENDER 3,324,760
THREE DIMENSIONAL UNAIDED VIEWING APPARATUS
Original Filed June 2, 1961 16 Sheets-Sheet 15

INVENTOR.
ROBERT B. COLLENDER
BY Harry R. Lubcke
AGENT

June 13, 1967  R. B. COLLENDER  3,324,760
THREE DIMENSIONAL UNAIDED VIEWING APPARATUS
Original Filed June 2, 1961  16 Sheets-Sheet 16

INVENTOR.
ROBERT B. COLLENDER
BY Harry R. Lubcke
AGENT

United States Patent Office 3,324,760
Patented June 13, 1967

3,324,760
THREE DIMENSIONAL UNAIDED VIEWING
APPARATUS
Robert B. Collender, Van Nuys, Calif.
(4264½ Fulton Ave., North Hollywood, Calif. 91604)
Original application June 2, 1961, Ser. No. 114,381, now Patent No. 3,178,720, dated Apr. 13, 1965. Divided and this application Dec. 30, 1964, Ser. No. 432,038
9 Claims. (Cl. 88—24)

This application is a division of my copending application Ser. No. 114,381, filed June 2, 1961, now Pat. No. 3,178,720, issued Apr. 13, 1965.

My invention relates to a system of recording and stereoscopic viewing of scenes and particularly to a method and means for accomplishing this purpose without viewing aids at the eyes of the observers.

Man has sought for decades to reproduce scenes in stereoscopy without the use of viewing aids at the eyes of the observers and in a manner such that a number of persons might view such scenes at one time and without restriction as to their various individual positions.

I have found that by presenting a relatively very large number of related images of the scene to be viewed behind a rapidly moving vertical slit aperture the parallax thus occurring prevents one eye of each observer from seeing what the other eye sees at any and every instant of time. The aperture being in motion, each eye sees a complete image within a short interval of time. I make this interval within the presistence of vision for human observers. The brain fuses the two eye observations into a single stereoscopic view image, as my practical results predicate.

Accordingly, I am able to present a stereoscopic view of a scene to one or any reasonable number of viewers. If any or all of the viewers walk around my appartus they will see the scene in different aspect, just as though they walked around the same scene in real life.

If the scene is reproduced from a series of still transparencies taken around the scene according to my method and apparatus the objects within the scene are stationary and a still stereoscopic picture is obtained.

Considering my system in greater detail, the perspective that one eye of any observer sees is made up of discrete vertical lines of image information taken at discrete instants of time. At these same instants of time the other eye of that observer sees a completely different perspective. The net perspetcive for the two eyes is different, of course, because the eyes are not coincident in space, but are spaced apart horizontally, as is well known. Considering the image as an entity, it is dissected in time and in space.

An object of my invention is to provide viewing of three dimensional images without the use of viewing aids at the eyes of the observer.

Another object is to provide a stereoscopic system in which various perspectives of the scene viewed may be obtained by changing one's position around the reproducing apparatus.

Another object is to provide a stereoscopic system in which various perspectives of the scene viewed may be obtained by changing one's position within the surrounding reproducing apparatus.

Another object is to provide a basic stereoscopic method applicable to known forms of image reproduction processes.

Another object is to provide means for reproducing relatively large images with practical stereoscopic apparatus.

Another object is to provide means for reprdoucing stereoscopic images that are relatively rugged and are suited to retain adjustments in practice.

Other objects will become apparent upon reading the following detailed specification and upon examining the accompanying drawings, in which are set forth by way of illustration and example certain embodiments of my invention.

Figure 2:
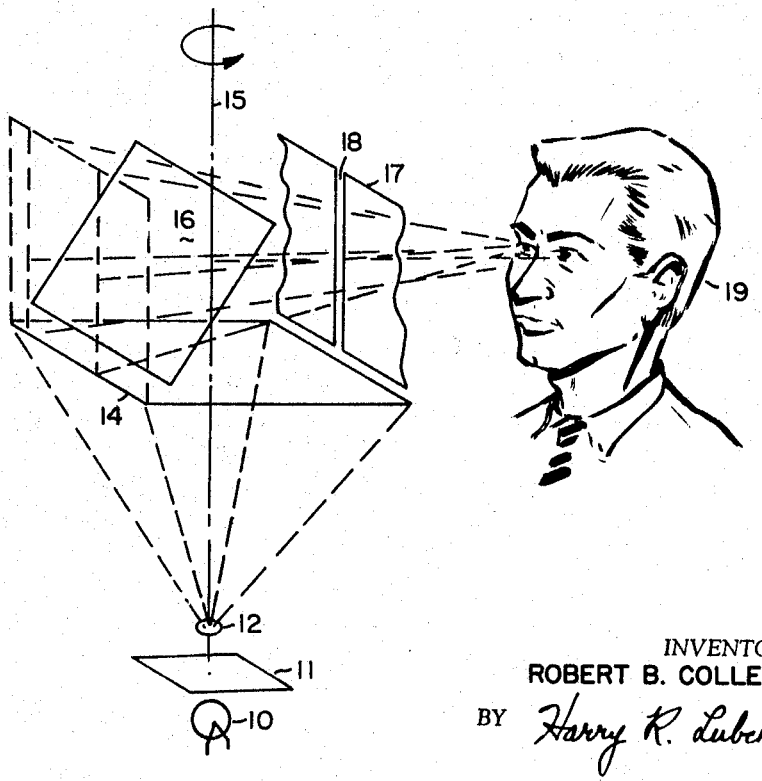
Figure 3:
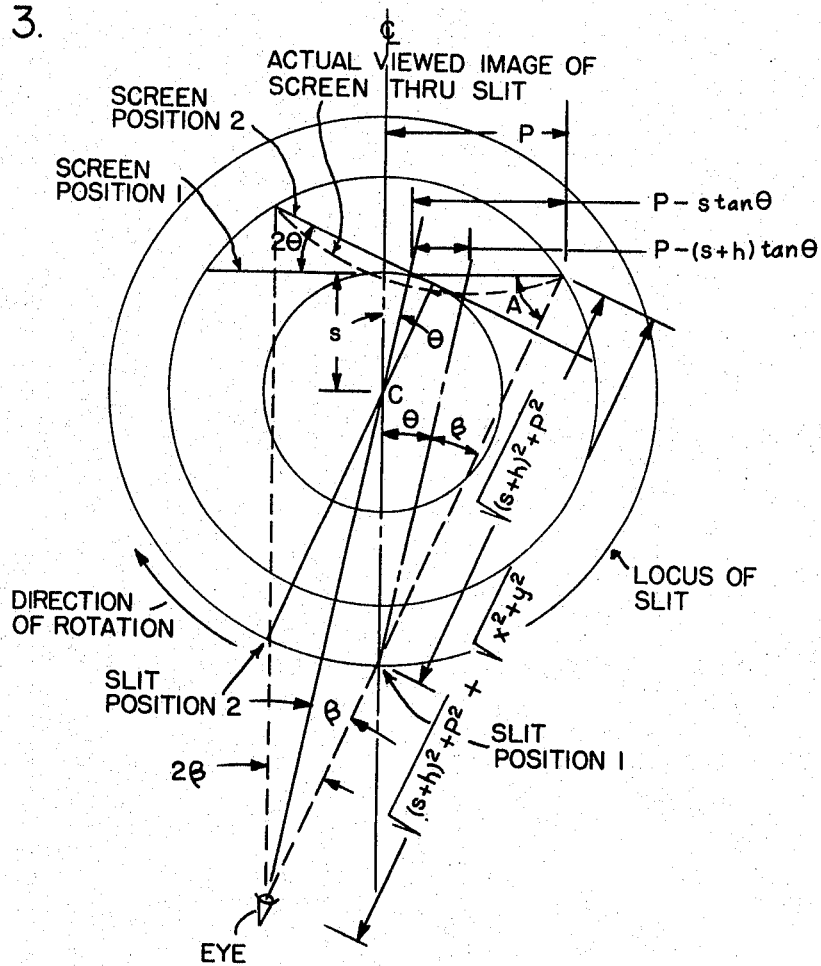
Figure 4:
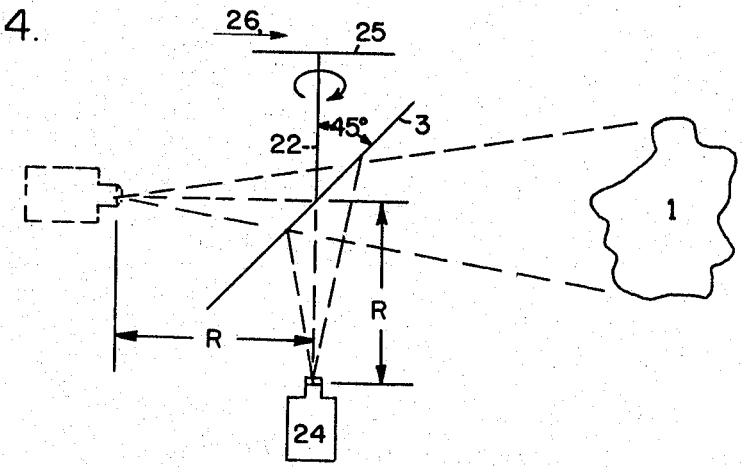
Figure 5:
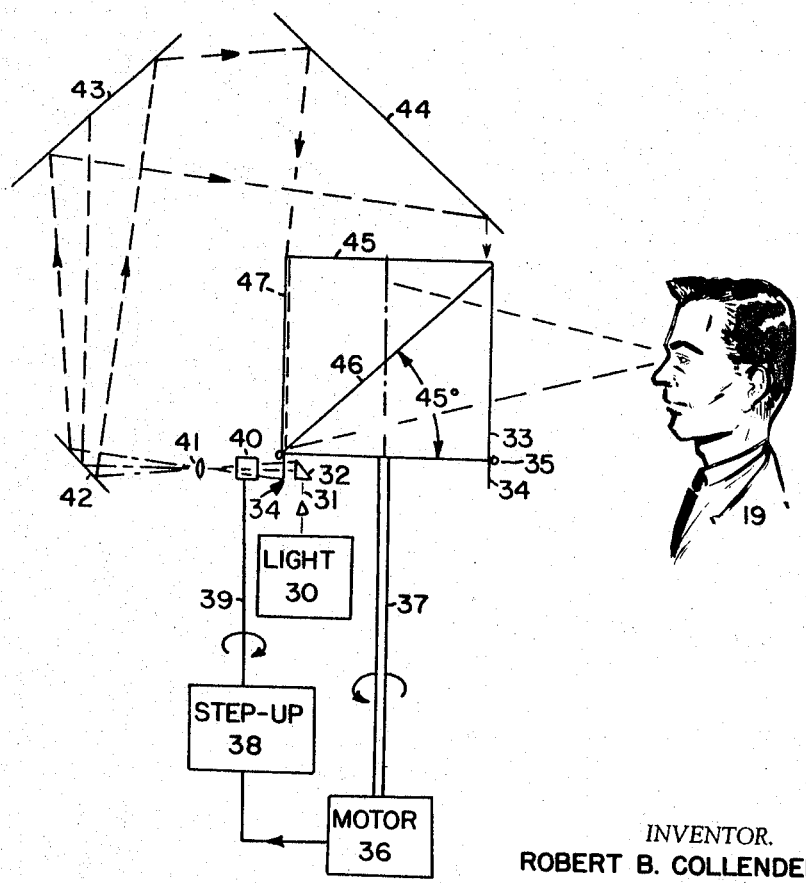
Figure 6:
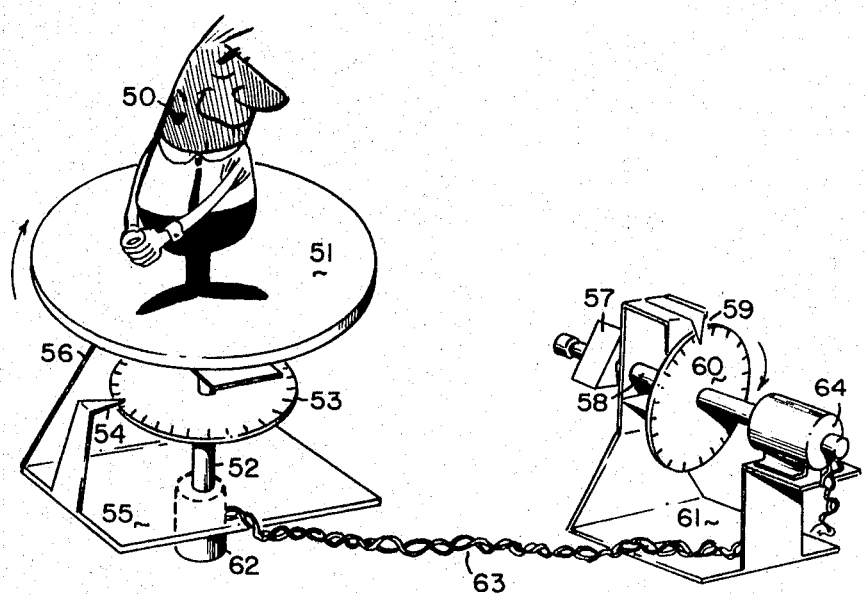
Figure 7:
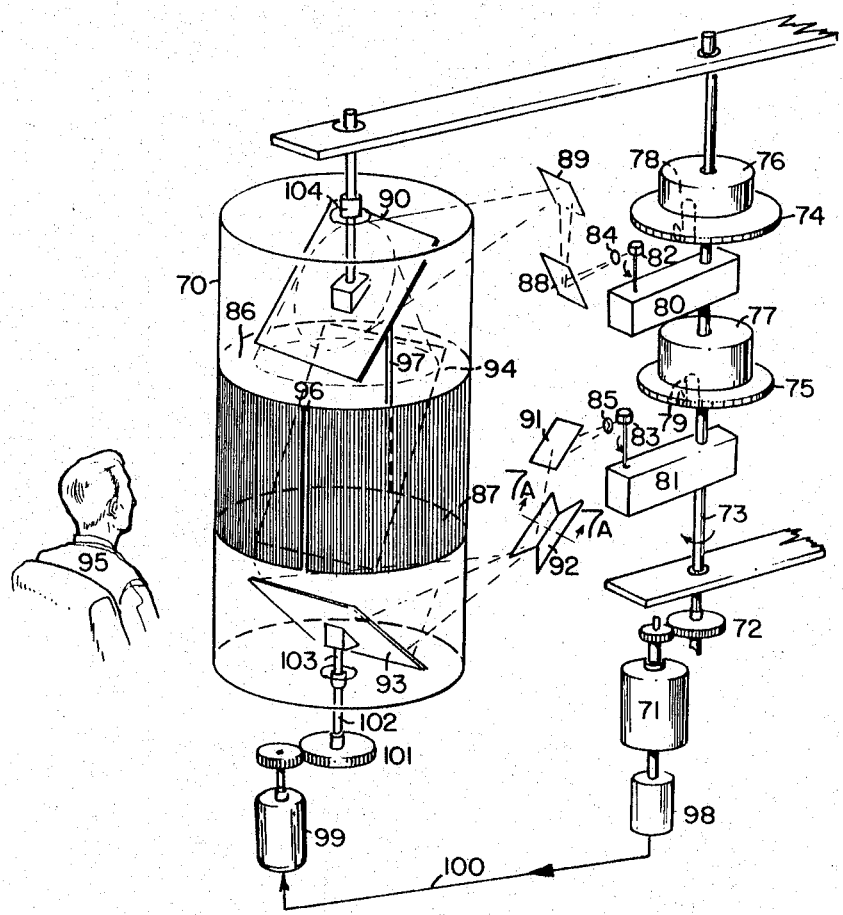
Figure 9:
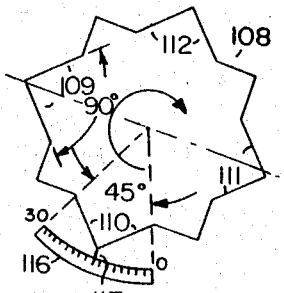
Figure 8:
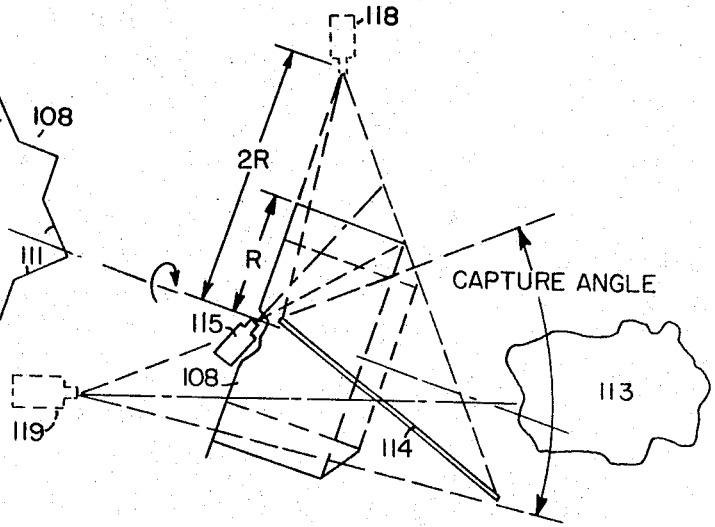
Figure 7A:
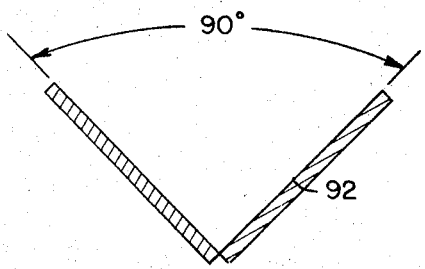
Figure 10:
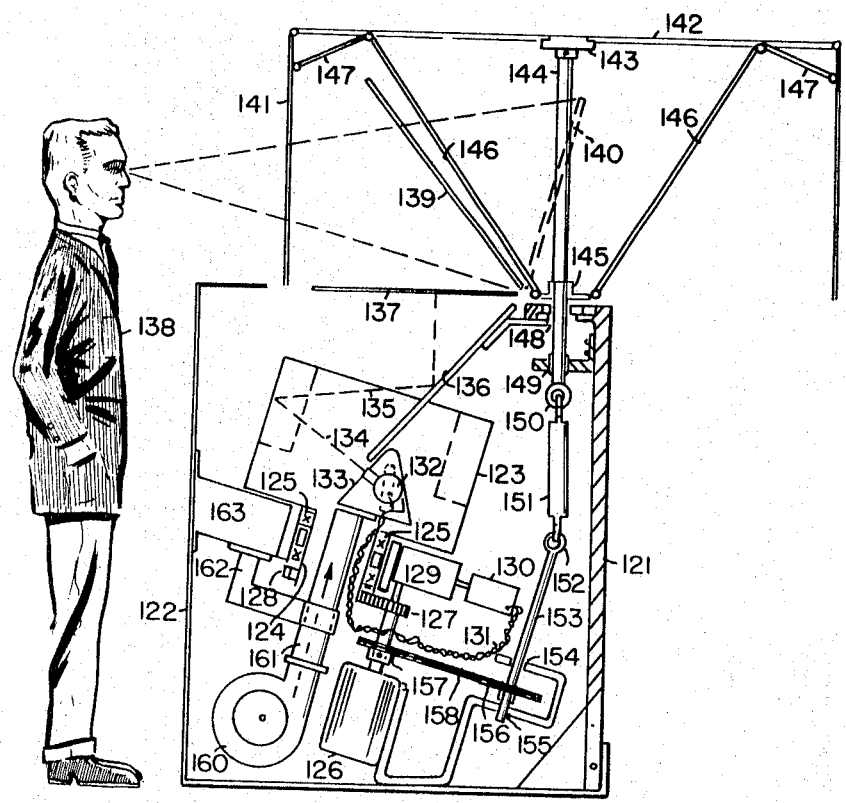

FIG. 1 shows a simplified conceptual drawing of the method and means for capturing pictures according to my invention, FIG. 2 shows a simplified conceptual drawing of the method and means for reproducing images according to my invention, FIG. 3 is a figure illustrating the mathematical relations governing the optics according to my invention, FIG. 4 shows a particular embodiment for capturing pictures, FIG. 5 shows a particular embodiment for reproducing images, FIG. 6 shows an alternate "turntable" embodiment for capturing pictures, FIG. 7 shows an alternate (two slit) embodiment for reproducing images, FIG. 7A shows a mirror detail of the embodiment of FIG. 7, FIG. 8 shows a side elevation of an alternate ("mirror drum of books") embodiment for capturing pictures, FIG. 9 shows an end elevation of the same, FIG. 10 shows an alternate ("mirror drum of books") embodiment for reproducing images.

Figure 11:
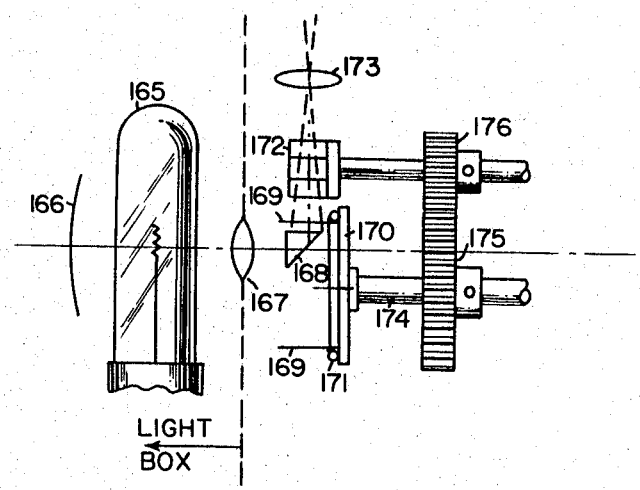
Figure 12:
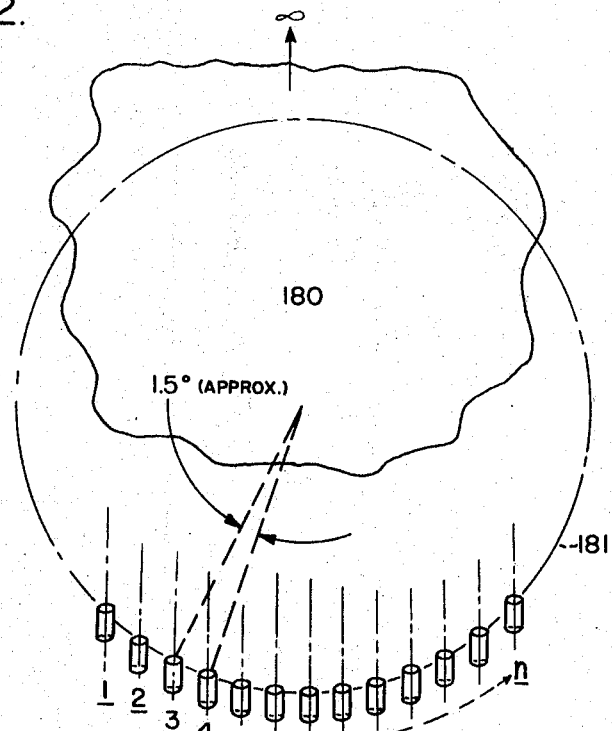
Figure 13:
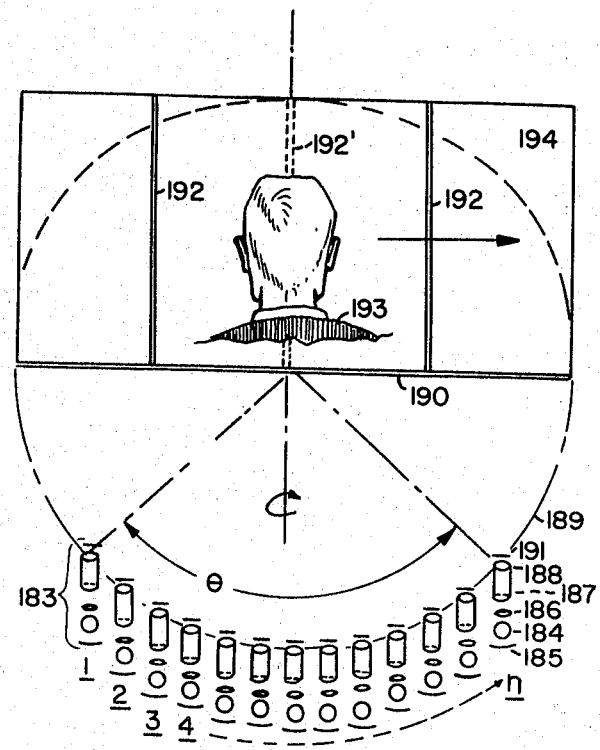
Figure 15:
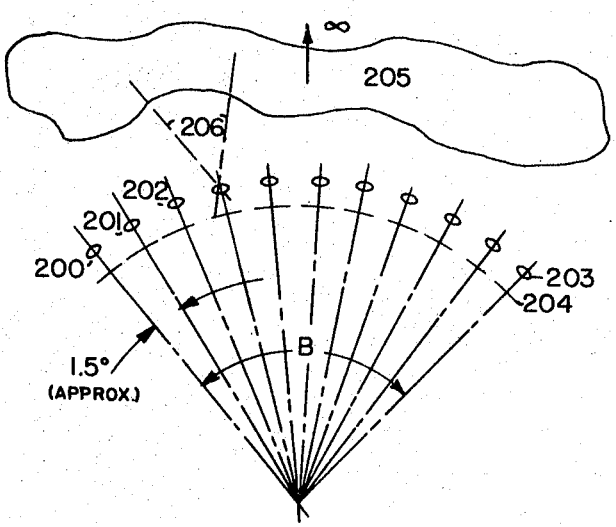
Figure 14:
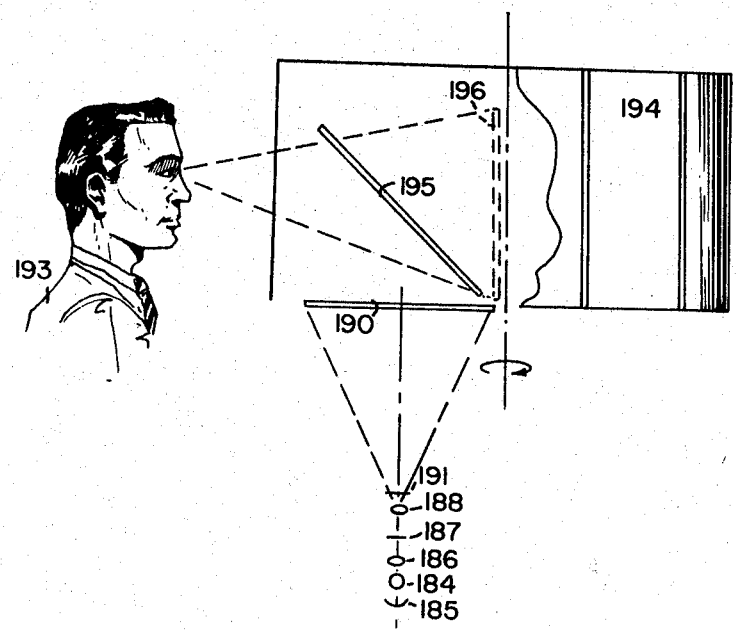
Figure 16:
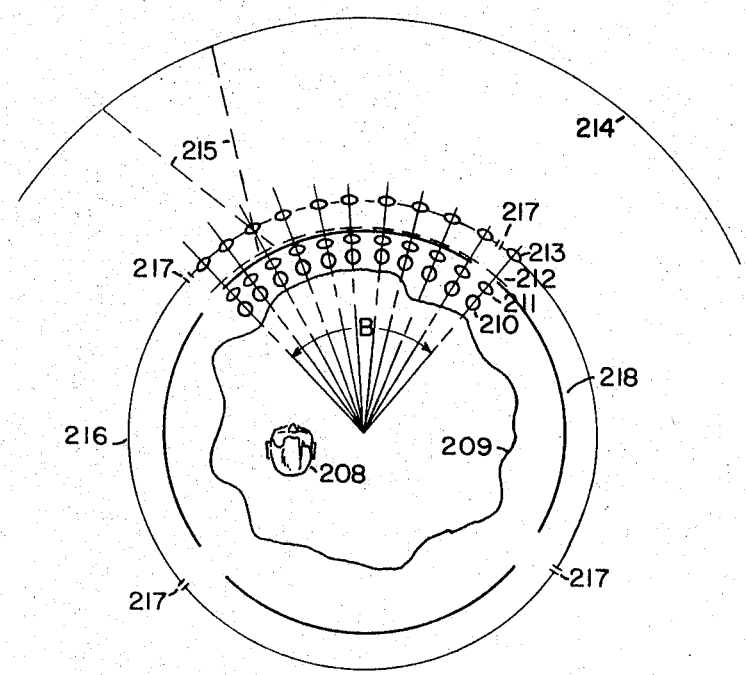
Figure 17:
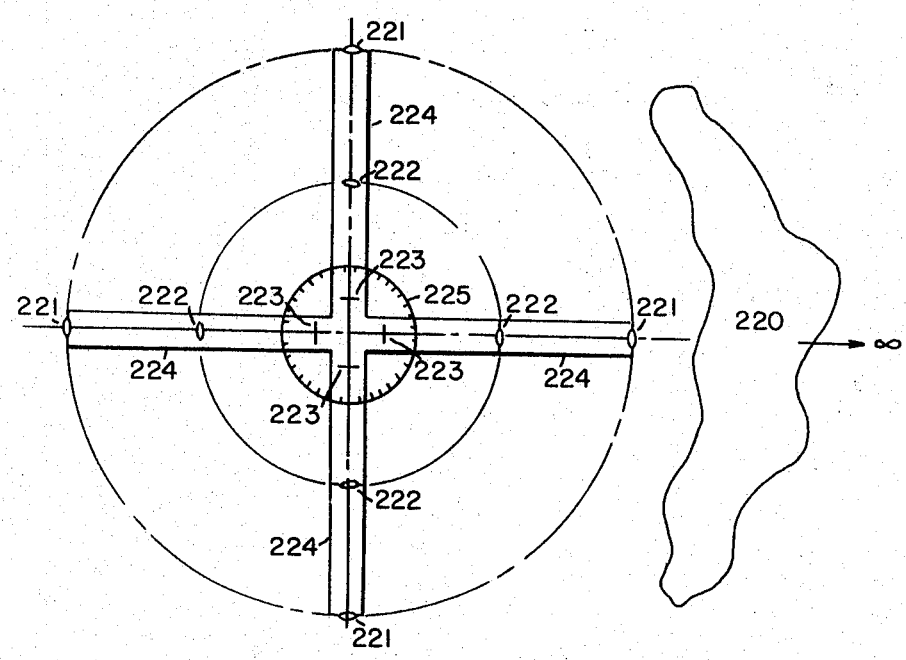
Figure 18:
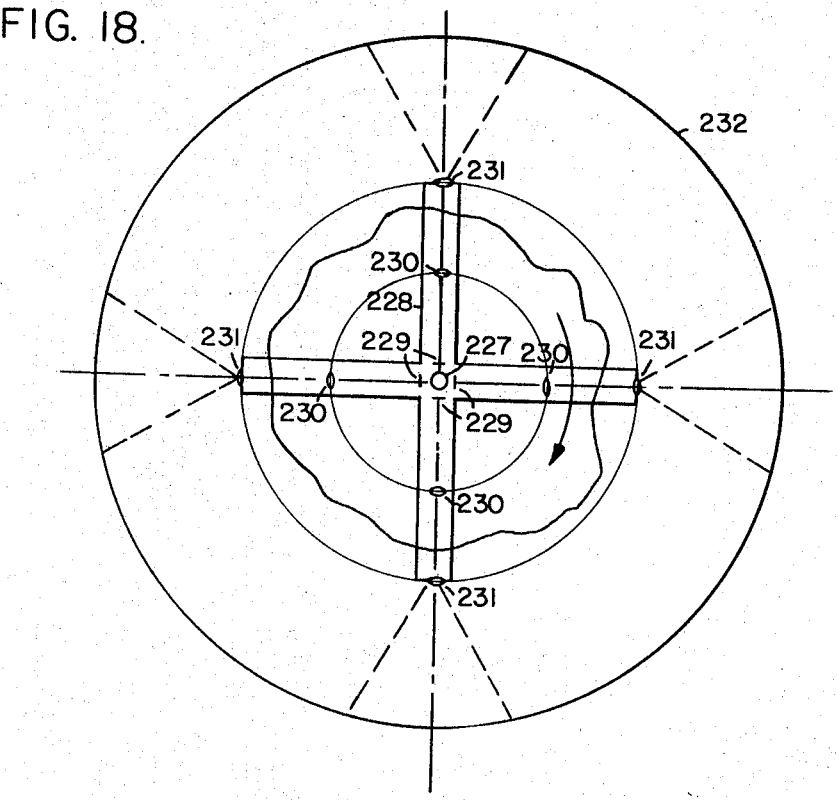
Figure 19:
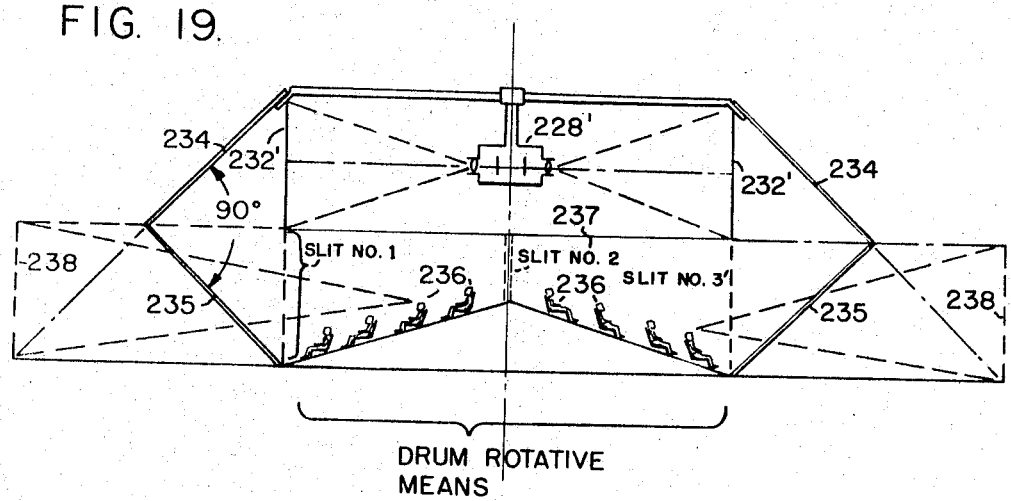
Figure 20:
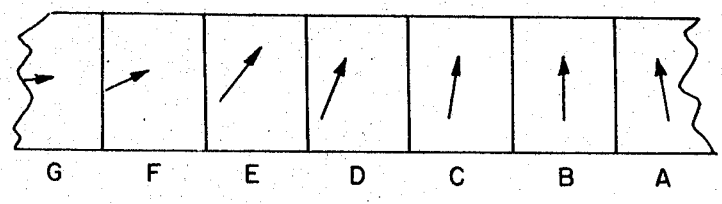
Figure 21:
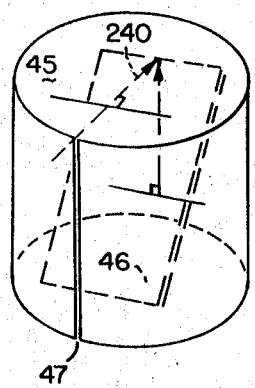
Figure 22:
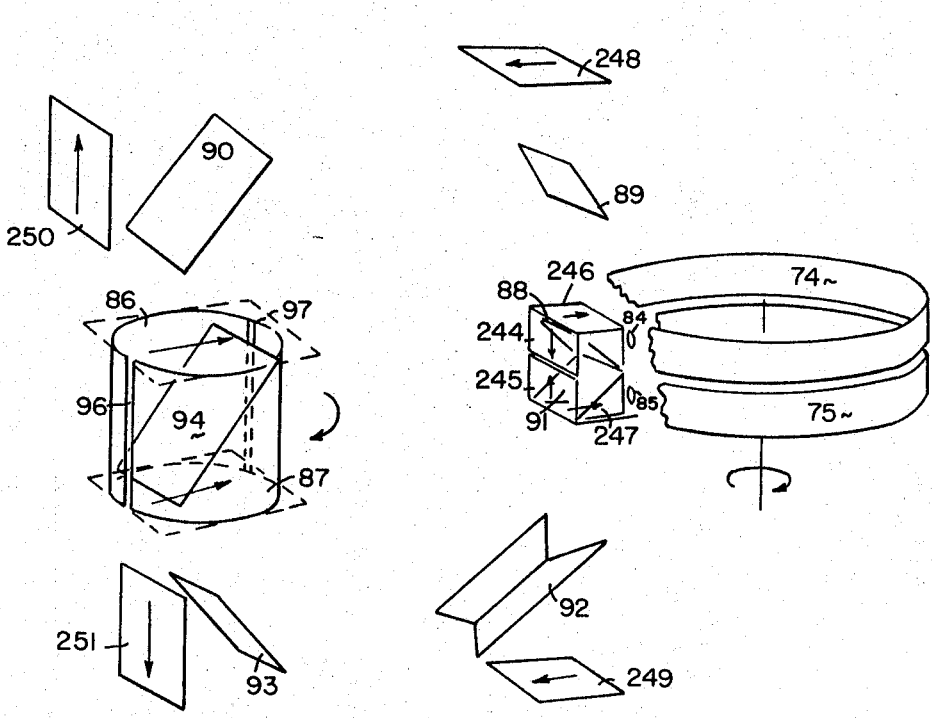
Figure 23:
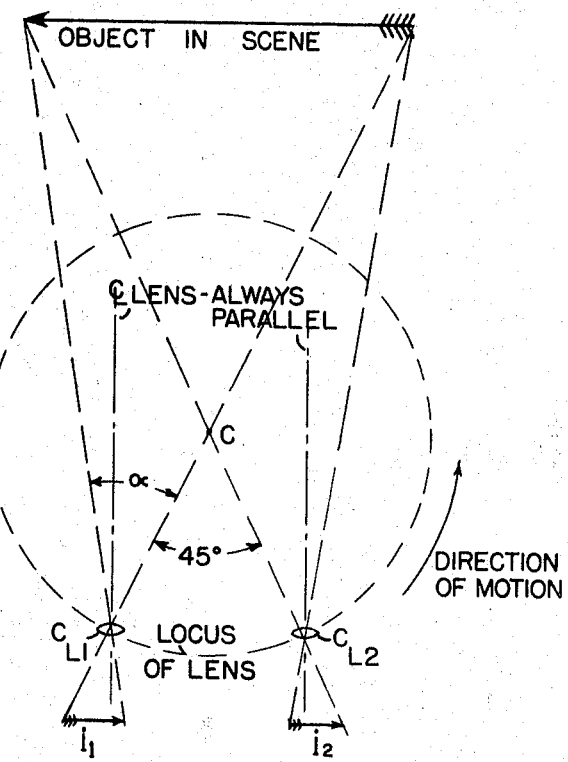
Figure 24:
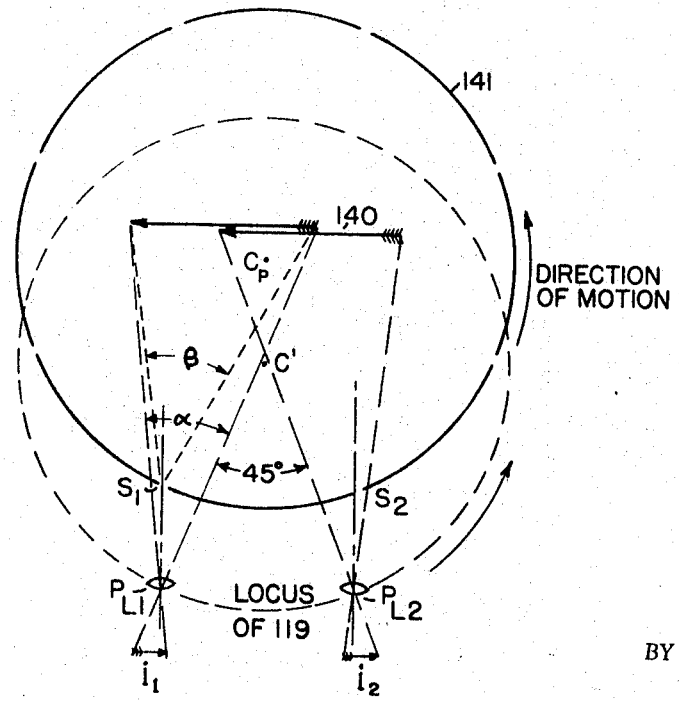

FIG. 11 shows a detail of the image forming part of the optical system of FIG. 10, FIG. 12 shows a plural parallel-planar camera arrangement for capturing pictures according to my invention, FIG. 13 shows a plural parallel-planar projector arrangement for reproducing images made with the apparatus of FIG. 12, FIG. 14 shows an end elevation of the projector arrangement of FIG. 13, FIG. 15 shows an optical diagram of an alternate ("concave") embodiment for capturing pictures according to my invention, FIG. 16 shows an optical diagram of an alternate ("concave") embodiment for reproducing images made with the apparatus of FIG. 15, FIG. 17 shows a four facet camera for capturing pictures according to the scheme of FIG. 15, FIG. 18 shows a four facet reproducing arrangement for reproducing images according to the scheme of FIG. 16, FIG. 19 shows a sectional side elevation view of another reproducing arrangement for pictures captured by camera shown in FIG. 17, FIG. 20 illustrates the progression of a typical image on successive frames of the film from the camera of FIG. 4, FIG. 21 illustrates the orientation of a typical image on the screen of a reproducing drum according to my invention, FIG. 22 illustrates the orientation of a typical image throughout the reproducer of FIG. 7, FIG. 23 gives the optical ray-tracing for the means of FIGS. 8 and 9, and FIG. 24 gives the optical ray-tracing for the means of FIG. 10.

In FIG. 1, numeral 1 represents an object in a scene that is to be "captured"; i.e., photographed for three dimensional reproduction according to my method. This is a generalized object, one illustrative of any part or of all of the scene to be so recorded. Rotative means are represented by vertical axis 2. A mirror 3 is inclined at 45° to axis 2. Also upon axis 2 a lens 4 receives the rays from object 1 and forms an image thereof upon sensitive plate 5. Both the lens and the plate are stationary.

Obviously, shutter means are required and means for replacing an exposed plate with an unexposed plate once an exposure has been made, but these are refinements to be discussed later. In this concept it will be seen that the optical path from mirror 3 to plate 5 has an analogue in horizontally disposed imaginary lens 4' and imaginary plate 5'. As mirror 3 rotates the positions of elements 4' and 5' rotate about vertical axis 2, describing a circular path 7 for the lens as shown dotted and an equivalent path for the plate that has not been shown for sake of simplicity and clarity. Without considering details, assume that a large number of separate images taken at different positions of mirror 3 are captured upon separate plates 5 and that this completes the capturing process.

Considering now FIG. 2, a source of illumination 10 illuminates a developed plate 11 (derived from plate 5). A projector lens 12 is disposed vertically above plate 11 and forms an image thereof on translucent screen 14. The centers of these elements define a vertical axis 15 similar to the prior vertical axis 2. Disposed at an angle of 45° to this axis is a mirror 16, similar in function to mirror 3. Means are provided to rotate mirror 16 at a rate to execute a complete revolution within the period of persistence of human vision (say, within 1/16 second in a practical embodiment). Also rotative with mirror 16 is an obdurating surface 17 having a vertical slit 18 therein. Surface 17 may take the form of a circumferential band around mirror 16. An observer 19 takes any position circumferentially on approximately the same level as slit 18 and looks into the apparatus in that direction.

Without detailing the means for change, assume that the plates 11 are changed very rapidly and in the same order as they were exposed in the apparatus of FIG. 1. Any period of time at all may be taken to complete the set of exposures in FIG. 1, but in the reproduction process of FIG. 2 these must be displayed in step with each incremental position of surface 17 and mirror 16, and any given plate must again reappear within the period of persistence of vision.

It will be understood that parallax will occur between the two eyes of the observer 19 and that one eye will see a relatively narrow vertical section of the image upon screen 14 as reflected from mirror 16 while the other eye will see another relatively narrow vertical section of the image. These two vertical sections are spaced from each other. At a later instant of time the two eyes again see other separate portions of the image because slit 18 is moving. In fact, the viewed portions of the image by the right and the left eye is continuously changing. Never does the right eye see what the left eye sees at the same instant, and vice versa.

By presenting a relatively large number of individually different scenes to the eyes, by taking, say, in excess of 200 separate photographs according to FIG. 1 for the full circle of exhibition, I have found that a continuous and faithful representation of stereoscopic vision is reproduced to any observer at any position around the full circumference of the reproducing apparatus of FIG. 2. There is no shutter action, the viewing is continuous. As one walks around the apparatus of FIG. 2 the aspect of the scene changes. One sees a particular object from one side as he comes upon it, then he views it straight on and then he sees the other side of it as he continues his traverse around the apparatus.

It will be cognized that the path 7 of the lens 4' in FIG. 1 and of the slit 18 in FIG. 2 need not be circular, but may be of any shape as long as both of these are the same. With the embodiment illustrated it is not necessary that both the capture and the reproducing process be accomplished in the same interval of time. Time is represented as a mere sequence in the photographic result of the process of FIG. 1 and the rate of reproduction in FIG. 2 is dictated by the requirement of the persistence of vision.

The angular relation of the reproduced image at the eye is set forth in FIG. 3. The mathematical expressions are for objects appearing behind the screen shown in FIG. 3 and for a one-to-one correspondence between capture and playback lens or lens-image locus and slit.

The symbols in FIG. 3 have the following significance:

$P = \frac{1}{2}$ of the actual width of the screen
$s$ = Distance between the center of rotation (C) and the screen
$h$ = Distance between the slit and the center of rotation (C)
$x$ = Lateral distance from (C) to eye
$y$ = Distance from extremity of the system to the projection of the eye location back to centerline From FIG. 3, by proportional triangles:

$$\frac{P-(s+h)\tan\theta}{P-s\tan\theta} = \frac{\sqrt{(s+h)^2+P^2}}{\sqrt{(s+h)^2+P^2}+\sqrt{x^2+y^2}}$$

from which let $K = \tan\theta$ $$K = \tan\theta = \frac{P}{\frac{h\sqrt{(s+h)^2+P^2}}{\sqrt{x^2+y^2}}+(s+h)}$$

Now $$\theta = \frac{\pi - 2(A+\beta)}{2}, \quad \tan\theta = \frac{\sin 2(A+\beta)}{1-\cos 2(A+\beta)}$$

and $$\begin{array}{l}\sin 2x = 2\sin x \cos x \\ \cos 2x = 1 - 2\sin^2 x\end{array} \text{ hence; } \tan\theta = \frac{1}{\tan(A+\beta)}$$

and $$K = \frac{1}{\tan(A+\beta)} = \frac{1-\tan A \tan\beta}{\tan A + \tan\beta}$$

Substitute $$\tan\beta = \frac{P - K(s+h)}{PK + (s+h)}$$

Finally;

$$\tan\beta = \frac{Ph}{\sqrt{x^2+y^2}\sqrt{P^2+(s+h)^2}+h(s+h)} \quad (1)$$

in (1), above $B = \frac{1}{2}$ the angle subtended at the eye by the total width of the picture illuminated area.

If the screen is on the opposite side of (C), toward the observer's eye, then Equation 1 becomes as below; where $h$ = slit to screen distance:

$$\tan\beta = \frac{P(h+s)}{\sqrt{P^2+h^2}\sqrt{x^2+y^2}+h(h+s)} \quad (2)$$

The capture process previously set forth is actually accomplished according to the apparatus shown in FIG. 4. This apparatus partakes of the nature of that of FIG. 1, but is modified for practical reasons.

The scene or object 1 and mirror 3 are as before. However, mirror 3 is supported by shaft 22, which is in turn supported by simple bearings not shown. Below mirror 3 and on the prolongation of the axis defined by shaft 22 there is located motion picture camera 24, or the equivalent, which is provided with a known frame-by-frame exposure shutter. Surmounting shaft 22 is circular protractor 25, divided for convenience into 1.5° increments; that is, 240 divisions for the full 360°. Pointer 26 makes it possible for the operator to position the protractor and hence mirror 3 at successive 1.5° increments, after which he snaps one frame of motion picture. This is repeated 240 times, total, going completely around in a circle, with the lens-image pointed toward the center of rotation. In general, the camera may contain 35 mm., 16 mm. or even 8 mm. film, or any of the wider professional films, depending upon the size of the final image to be reproduced, the brightness of image desired, the resolution desired and other practical optical aspects.

I have found that the 240 pictures per 360° gives a very pleasing and realestic reproduction of the scene. For theoretical optical perfection there should be an infinite number of pictures per scene, but this perfection is in no way required by the human eye. In fact, very good reproduction is attainable with as few as 180 pictures per 360° (i.e., one each 2°).

The full circumference of pictures having been taken, the film is removed from the camera, developed and photographic positives produced. A color picture produced from reversible color film is suitable and gives life-like reproduction. It will be found that the individual frames contain pictures oriented such that a normally vertical arrow is rotated slightly in successive frames and does not remain in the center of the frame. This is shown in FIG. 20, upon which further comment is made later.

A simple embodiment of my reproducing apparatus is shown in FIG. 5. The lamp 10 of FIG. 2 is exemplified in FIG. 5 by light box 30. This has the usual optical elements to produce a nominally colimated beam of light, such as a lamp of 1,000 watt rating, a reflector and a condensing lens. These elements are disposed to produce a vertical beam of light 31. This beam is then reflected at right angles by prism 32 and thus becomes horizontal; and radial with respect to drum 33. The motion picture film previously prepared is cemented into a single circumferential loop by known splicing techniques and is fastened to drum 33 circumferentially at 34. A circumferential garter spring 35, of small cross-section, is useful for retaining this loop to the drum and allowing easy changing of one film loop to another. The placement of the light box below the point where the light beam therefrom is actually used is dictated by the practical considerations of mechanical parts that are in the way directly under drum 33.

Drum 33 is driven by motor 36 through vertical shaft 37. The motor may contain a gear box or the equivalent to revolve shaft 37 at 960 revolutions per minute (r.p.m.) in a practical embodiment and may be of fractional horsepower. Suitable bearings are provided for the shaft but are not shown for sake of clarity. Also for sake of clarity a step-up gear box or toothed belt system 38 is shown schematically and displaced from shaft 37. It supports a high speed vertically disposed shaft 39, to which an eight-sided optical prism 40 is attached. By noting the arrows surrounding shafts 37 and 39 it is seen that these shafts revolve in opposite directions. Shaft 39 revolves 30 times faster than shaft 37 in a typical embodiment. This provides an optical compensating action and makes the image of film 34 stationary as viewed by looking into the prism.

The light flux from the prism is collected by projection lens 41. The direction of this light flux as it emerges from the lens is changed three times in order that a real image may be formed for viewing. The first alteration of direction is accomplished by mirror 42, which is inclined at 45° to the horizontal so that the light flux is directed vertically upward. A second mirror 43 changes the path to the horizontal toward the center of rotation 37 and a third mirror 44 changes the path to vertically downward and to translucent screen 45, the equivalent of screen 14 in FIG. 2. Screen 45 may either be stationary by attachment to an immovable support or it may be integral with drum 33 and thus rotating. What the image thereon does is determined by other optical elements and I have found it easily possible to form the screen of a sufficiently homogeneous substance, such as Mylar, lenticular plastic or waxed paper, so that no visual defects are noted despite the rapid rotation. The image upon screen 45 rotates at the same speed and in the same direction as drum 33. It is always oriented such that the base of any of the 240 frames is at right angles to the slit in the drum, slit 47. A vertical arrow in the scnene is at right angles to the base of the picture and points away from the slit toward the back of the drum.

A mirror 46 is disposed within drum 33 and revolves with it. The reflecting surface thereof is upwards. This mirror is the analogue of mirror 16 in FIG. 2, save that the optical system of FIG. 5 is inverted with respect to that of FIG. 2 in that part of the apparatus.

Squarely opposite to the reflective surface of mirror 46 is slit 47, formed the whole vertical dimension of drum 33, save for a suitable rim top and bottom for mechanical structure reasons.

Observer 19 looks into the slit in the drum as before. It happens for the instant chosen for the drawing of FIG. 5 that the slit is exactly 180° away from the observer. However, should he position himself oppositely to the position shown (which was selected for drafting convenience) he would be viewing the image at that instant. This situation has no practical significance, however, since in $\frac{1}{32}$ second the drum will have revolved so that slit 47 is in front of the observer.

As before, this process is repeated so rapidly as to cumulate the images in the brain of the observer. Thus, he does not see individual images of the original scene, but so many of them with left and right eye separation that true stereoscopic perspective is established for him and he may change his position around the apparatus and the aspect he views will change accordingly.

For every 1.5° of rotation of the drum a new picture is formed upon the screen. A kind of "lingering perspective" occurs which blends each picture into the next with excellent continuity. It will be understood that should one look directly down upon screen 45 during normal operation he would see only a blur because the image thereon is changing perspective according to the 240 individual pictures and is rotating at 16 r.p.s. in order to follow the rotation of the drum. However, when the observer looks through the slit 47 he sees three dimensional visual information with pleasing definition.

The apparatus of FIG. 5 may be proportioned according to the optical analysis of FIG. 3. The proportions may be such that the image appears in natural size, or with "giantism" or "dwarfism," which latter effects do not give distortion, only a change in size.

If the diameter of the capture lens locus (4' in FIG. 1) is greater than the diameter of the slit locus (i.e., the diameter of drum 33 in FIG. 5) dwarfism results. If the reverse is true, giantism results. A one-to-one ratio of these dimensions results in neither giantism or dwarfism.

There is a proper width of slit 47. If it is too narrow dark bands at 1.5° (angular) intervals appear across the viewed image. The same effect is noted if the slit is too wide. These bands are caused by the silhouette of the edges of the optical compensator 40 of FIG. 5 for each frame. In practice a proper width (circumferentially) for slit 47 is $\frac{5}{32}$" for a diameter of drum 33 of 14". In any embodiment the proper width is easily found as that width at which the dark bands disappear.

The capturing apparatus of both FIGS. 1 and 4 provides for a view "looking in" in reproduction. The object 1 in these figures appears to be "suspended in space" before one's eyes. If a background is provided this is also seen in stereoscopic relief when taken with this capture apparatus.

In FIG. 6 different means are provided in which the object or objects being captured are photographed by being incrementally rotated. This is conveniently accomplished by placing the object or objects, such as the man 50, upon a rotatable platform 51. It will be understood that this platform may be as small as a few inches in diameter or as large as fifty or a hundred feet in diameter. These limitations are mentioned as a general guide but, of course, may be exceeded in either direction insofar as my method is concerned.

As with the means to rotate the mirror of FIG. 4, a vertical shaft 52, a circular protractor 53 and an indicating means or pointer 54 are provided in order to move the subject rotatively with equal incremental angular amounts. Shaft 52 is conveniently journaled in a base 55 and a bracket 56, or in equivalent structural elements.

It will be understood that in either of FIGS. 4 or 6, pointers 26 or 54 may be replaced by a detent device which fits into circumferential depressions in the circular protractor so that the orientation is easily accomplished in the equal increments. Furthermore, an electrical switch can be provided and actuated coactively with the detent mechanism. A brief electrical circuit delay is also provided and a connection to the camera shutter to automatically open the same forthwith upon each increment of revolution being accomplished. In this way a complete circumferential photographing of the object scene may be accomplished within a relatively brief interval of time, as in one minute.

In FIG. 6 camera 57 is mounted upon a fitting and attached to shaft 58 so that the optical system of the camera is concentric with the axis of the shaft. A pointer 59 and protractor 60 are also provided in connection with shaft 58 for manual orientation of the camera in synchronism with the incremental revolving of platform 51. It will be noted by the arrows that the platform is turned clockwise as viewed looking downward from above it, while the camera is turned clockwise as viewed from the rear of the camera assembly. These directions of rotation are required to comply with the optics of the projection system of FIG. 5 and do not constitute an inflexible standard. A base 61 is provided for the camera assembly and this base is monolithically related to base 55 for the platform 51.

It is necessary that camera 57 be rotated, one complete revolution for one complete revolution of platform 51, so that the image will remain upright as viewed by observer 19. The pictures sequentially appearing upon the film loop turn in a circle and the image upon screen 45 in FIG. 5 turns once for one revolution of drum 33.

It will be understood that the rotation of camera 57 can be automatically synchronized with the motion of platform 51 by providing a selsyn link between the two. This is accomplished by providing selsyn unit 62 attached to shaft 52, or alternately, geared thereto. Conductors 63 lead therefrom and to slave selsyn motor 64 which drives a shaft 58 for rotating the camera. A suitable source of electrical energy to provide magnetic flux for the selsyn units or any desired gear arrangements for increasing mechanical precision of the locked electrical poles are well known and so have not been illustrated. It will be realized that the master and slave relation between selsyn units 62 and 64 may be interchanged and that a motor drive for platform 51 coactive with selsyn unit 62 as the controlling force can be arranged.

With the capturing system of FIG. 6 all objects upon the rotating platform are reproduced in three dimensions but the background, if any, is reproduced in two dimensions (i.e., a "flat" image). This is not a bar to the practical application of the system of FIG. 6 since it is known that in a background the stereoscopic effect is at a minimum.

The reproducing apparatus of FIG. 7 is of the same general nature as that of FIG. 5. However, the embodiment of FIG. 7 has two complete optical systems and has two slits in drum 70. Thus this drum rotates only half as fast as drum 33 of FIG. 5; i.e., at approximately 8 revolutions per second instead of 16 revolutions per second.

Motor 71 is the prime mover for the image-forming part of this device. It is mechanically connected through gear train 72 to vertical shaft 73 and imparts to the latter a rotational speed of eight revolutions per second.

Pictures for this embodiment may be captured by the prior embodiments of FIGS. 4 or 6, but two strips of the film transparencies are required. These are identical and are simultaneously exhibited, but with 180° difference in circumferential position. Film loop 74 occupies a given position and is held in place by a garter spring, etc. as has been previously described. Identical loop 75 is placed in position on its drum half-way around with respect to the position occupied by film 74. Two drum structures 76 and 77 attach the respective films to shaft 73 and also serve as lamp houses.

Within drum 76 is located lamp and condensing lens assembly 78 and within drum 77 a duplicate assembly 79. These are each of the construction to be found in known slide projectors and the like. Film loops 74 and 75 are thus illuminated from the inside.

Two identical step-up mechanical devices 80 and 81 provide the rapid rotational speed for faceted prisms 82 and 83. Each of these are duplicates of corresponding elements 38 and 40 described in connection with FIG. 5. The present systems each also give rotation of the prisms in the direction opposite to the rotation of shaft 73 so that the image will be demotionalized as before.

Projection lenses 84 and 85 focus an image of each film loop on separate translucent screens 86 and 87, respectively. For the upper optical system this is accomplished by single-surfaced mirrors 88, inclined at 45° upward; 89, inclined at 45° downward; and 90, inclined at 45° downward. For the lower optical system, the light path from lens 85 includes single-surfaced mirrors 91, inclined 45° downward; 92, a 90° book-type mirror inclined 45° upward and required to orient the lower image properly for the observers; and mirror 93, inclined 45° upward. All of these mirrors are stationary.

Within drum 70 there is a single but two-sided mirror 94, which makes an angle of 45° to the horizontal and serves to make either the upper or the lower incoming image visible to viewers, of which observer 95 is one example. Mirror 94 rotates with drum 70. It is placed at right angles to the perpendicular diameter between the two slits 96, 97. Other observers may take any position around the drum.

Drum 70 is revolved in a one-to-one relation of speed with respect to shaft 73. This condition is conveniently obtained by means of a selsyn synchronous electrical loop comprised of generator 98, motor 99, and electrical circuit connection 100 therebetween. This is a known arrangement and may include an additional power-supplying motor (not shown) for drum 70. Selsyn motor 99 then supplies only a sufficient power to keep the drum in synchronism with shaft 73. A gear train 101, similar to 72, is shown connecting motor 99 to drum 70 through shaft 102. Within the shaft 102 is rod 103, which is stationary and holds stationary mirror 93. In a similar manner at the top of the drum a revolving bearing 104 is provided so that mirror 90 may be held stationary.

As with the reproducers earlier described, the maximum height of the image observed is the height of the vertically disposed slits and these, in turn, are equal to the horizontal projection of the in-drum slanting mirror 94. The width of the image is approximately equal to the diameter of the drum.

FIG. 7A sectionally details the 90° "open book" relation of mirror pair 92 of FIG. 7. The inner upper surfaces are the reflecting ones.

FIG. 8 shows a side elevation of a camera mechanism for capturing stereoscopic pictures according to my method in which only the "mirror drum of books" 108 rotates. This drum is more clearly shown in the end elevation of the same in FIG. 9. The drum is composed of a plurality of individual 90° mirror books, say eight, as shown, of which alternate books have been numbered, 109, 110, 111 and 112.

In FIG. 8 the object to be captured is shown as 113. Element 114 is a stationary mirror, inclined to the horizontal. A single motion picture camera 115 is located at the rear of drum 108 with the optical system of the camera lying at the center of rotation of the drum and oriented upward so as to "look" into the book of mirrors at the top of the drum. In FIGS. 8 and 9 mechanical details such as bearings have been omitted to enhance the clarity of optical presentation. Bearings are provided in a quasi-circumferential arrangement so that there is room to physcially place camera 115 at the center of rotation.

This camera mechanism functions optically as follows. The drum is rotated incrementally. For each increment one frame of motion picture film is exposed in camera 115. In a hand-operated embodiment a scale segment 116 embracing 45° is provided, along with pointer 117 that is attached to drum 108. The scale may conveniently have 30 divisions, thus giving 1.5° for each division. The drum is set at the zero division and a frame is exposed in camera 115. The drum is then rotated to mark 1 and a second frame is exposed, and so on.

It is possible, of course, to have the exposure function mechanically or electro-mechanically synchronized to the incremental rotation of the drum and so the series of 30 pictures for a picture film loop can be taken very rapidly.

The optical effect of the book of mirrors drum and the one camera is to simulate two cameras; one 118, moves in a nearly vertical plane at a radius of 2R. R is the radius of the mirror drum 108 measured to the 90° apex of a book. Similarly, simulated camera 119 moves in a nearly horizontal plane, also at a radius 2R. Simulated camera 119 is the one that moves around object 113, subtending an angle of 360/n degrees at its center of rotation. "n"=number of books. In the present case this is 8 and so the angle is 45°. As has been described, pictures are taken sequentially. The drum can be rotated incrementally and held stationary for each photograph, or it is possible to rotate drum 108 continuously and allow a vertical slit of scene information to be recorded upon the film such that the slit passes before the camera lens and hence over a frame in the time for simulated camera 119 to move the 1.5° I prefer in the practice of my invention.

The capture embodiment of FIG. 8 and 9 gives a film for an eight-slit reproducer. The camera image 119 moves over one-eighth of a circle before another image of the camera takes its same space location because of re-imaging by the next book of mirrors on drum 108. The number of slits required for reproduction is equal to the reciprocal of the fraction of the full-circle traversed by camera image 119.

FIG. 10 shows a practical embodiment of the eight-facet drum of mirror-books reproducer. In this embodiment the image that was taken over a 45° angle is reproduced eight times in the time required for the drum of eight slits to revolve one revolution. That is, any observer need move only 45° around the apparatus if he wishes to examine the whole of the three-dimensional perspective that is afforded him. This is only one-eighth that afforded by a full circumferential examination of the one or the two slit drums of FIGS. 5 or 7. At any fixed position, of course, the observer sees a three-dimensional display in any case.

In FIG. 10 a general support 121 and frame 122 provide base facilities for the embodiment. A drum of mirror-books 123 is disposed on an axis inclined about 15° to the vertical. This drum is either the same size, or is proportional in dimensions to the previously described drum for the capturing apparatus; i.e., drum 108. Drum 123 is provided with a relatively large hub 124, which is surrounded by a pair of ball bearings of correspondingly large circumference, or the equivalent, 125. Motor 126 is the prime mover and it is provided with spur gear 127. This gear meshes with ring gear 128, which surrounds the bottom of the drum hub 124.

Also connected to motor 126 is a gear box 129. The latter gives a step up ratio in speed that is proportional to the number of facets in the drum of mirror-books; in this embodiment, eight. A selsyn transmitter 130 is connected to the high speed shaft of gear box 129. Transmitter 130 is electrically connected by wires 131 to a selsyn receiver 132. This is outside of light box 133, which is more fully revealed in FIG. 11. Suffice it to say at this time that the loop of film obtained by employing the camera of FIG. 8 is attached to receiver 132 and so rotates at eight times the rotational speed of drum 123.

A projection lamp, etc. is provided within light box 133 and the centerline of the optical image path from light box 133 is shown as 134. This strikes the inner (reflective) surfaces of the mirrors in drum 123 and passes back at 135 to be again reflected by stationary mirror 136, which is disposed at an angle of 45° to the horizontal (approximately). From there the image path passes straight upwardly and an image is formed on translucent screen 137. This image is viewed by observer 138 in mirror 139. The image appears as if it was on a screen 140, the erectness of which can be enhanced by altering the angles of the optical system recited.

A drum of slits 141 is provided to rotate between the reproduced image and the eyes of the observer. This is formed in an "umbrella" construction in FIG. 10. A top disk 142 is horizontally disposed and arranged by means of hub 143 to surmount shaft 144. A second hub 145 is spaced below hub 143 on shaft 144. A plurality of supports 146, or the equivalent in a conical support with apex downward gives structural rigidity to the drum of slits 141. These terminate at the lower end in hub 145 and in the upper end at the underside of disk 142. A supplemental support structure extends from the underside of disk 142 to the inside periphery of drum 141 in the form of rod-like struts as a very small section of a cone 147.

Shaft 144 is provided with spaced bearings at 148 and 149 and with a universal joint at 150. Another section of shaft 151 extends downward to a second universal joint 152, which in turn attaches to shaft 153. The latter is on a 15° angle to the vertical, as was the drum of mirror-books. Shaft 153 is provided with two spaced bearings 154 and 155 and with a sprocket 156. A matching sprocket 157 is provided on the shaft for motor 126. A chain-belt, or equivalent locked-relation mechanical link, runs between sprockets 156 and 157. The ratio of this drive is 15/1, speed reducing, for a motor speed of 1800 r.p.m. Both drums 123 and 141 revolve at 2 revolutions per second. With 8 slits on the latter this gives the desired 16 images per second for the observer.

An air blower 160 cools the lamp in light box 133 and also acts as a support for the same. It passes through the large throat of hub 124. The blower tube 161 is supported by arm 162, which in turn is supported by side support 163.

Observer 138 is shown standing, but by positioning the whole structure bounded by elements 121, 122 below floor level by approximately ⅔ the height thereof, the viewing height is suited for seated observers.

FIG. 23 represents the optical ray-tracing that applies to the eight facet capture apparatus of FIGS. 8 and 9. Camera image 119 in FIG. 8 is shown in two locations $C_{L1}$ and $C_{L2}$ in FIG. 23 during the operation of the device. The object is an arrow, as represented at the top of the figure. The images thereof are $i_1$ and $i_2$ formed by $C_{L1}$ and $C_{L2}$, respectively, on the film in the actually stationary camera 115 in FIG. 8.

FIG. 24 shows the reproducing tracing of rays that applies to FIG. 10. The playback (reproducing) center of rotation $C_P$ of the drum of slits is shifted in position with respect to the imaginary center of the locus of motion of camera 119, which imaginary center is designated by $C'$. $P_{L1}$ and $P_{L2}$ are positions of the projection lens image locus corresponding exactly to the positions $C_{L1}$ and $C_{L2}$ in FIG. 23. The processed transparencies exposed in the camera of FIG. 8 are $i_1$ and $i_2$ in FIG. 24. If $i_1$ and $i_2$ are extended through $P_{L1}$ and $P_{L2}$ then the original arrow is formed on the image of the screen 140 in FIG. 10. If $C'$ and $C_P$ were superimposed and an observer looked through slot $S_1$, which would then be coincident with $P_{L1}$, the image would have a one-to-one correspondence with the original arrow. However, since $C'$ is separated from C_P and the observer looks through slot S_1 he sees the arrow on the image of the screen with an included angle of $\beta$, which is greater than angle $\alpha$. Angle $\alpha$, of course, is the angle that would have been subtended had C′ and C_P coincided.

An increase in size, or giantism, in the ratio of $\beta/\alpha$, times the size of the original object results. The displacement and concomitant giantism is occasioned by screen 137 of FIG. 10 being near the edge of the drum of slits 141 because of mechanical interference with shaft 144. If the screen was shifted nearer the center of drum 141 C_P could be made to coincide with C′ and a one-to-one correspondence between capture and reproduction obtained.

FIG. 11 reveals the opto-mechanical details of the projection system employed in the reproduction apparatus of FIG. 10. An incandescent projection lamp or the like 165 is provided with a reflector 166 and a condensing lens 167 in order to concentrate light in the vicinity of right-angle prism 168. This light, after passing through the prism, strongly illuminates a frame of film 169. A continuous loop of film previously exposed in the camera of FIG. 8 comprises film 169 and this is detachably mounted on circular film-holder 170 by means such as garter spring 171.

After having passed through the film the light is deflected by the rapidly revolving multi-sided prism 172 and is collected by objective lens 173 for focus of a much enlarged image upon translucent screen 137 of FIG. 10.

Film-holder 170 is fastened upon shaft 174, which rotates at "n" times the speed of slit drum 141 of FIG. 10; i.e., eight times that speed in the subject embodiment. By means of meshing gears 175, 176 the multi-sided prism 172 (optical compensator) is driven 3¾ times faster than the film loop, as by 90 teeth on gear 175 and 24 teeth on gear 176. This demotionalizes 30 pictures on the filmloop.

In previously described embodiments a single camera has been laterally diverted about an object to record the required parallax views. The embodiment of FIG. 12 accomplishes the same result by employing a plurality of fixed cameras. The cameras are arranged so that the films therein lie in parallel planes. The lenses conveniently lie on the arc of a circle about the object to be captured, but this disposition is not mandatory. In making an exposure with this embodiment the shutters of the separate cameras are actuated simultaneously or may be actuated sequentially as long as there is no motion in the field of view during the sequence.

Specifically, shape 180 in FIG. 12 represents the field of view, and cameras 1, 2, 3, 4, . . . n are arranged in the arc of a circle 181 with the lenses of the cameras pointed at the field of view along parallel axes. The separation between cameras is preferably made such that the central angle of the arc upon which these are disposed is of the order of 1.5°, the desirable stereoscopic increment determined by my work.

It is relatively evident that the camera arrangement of FIG. 12 is capable of capturing objects within a field of view with as great a depth of focus as is obtainable in ordinary photography. It should also be noted that this same depth of focus is also available in the earlier presented camera arrangements employing only one camera, thus the photographic aspects of my method are favorable.

FIG. 13 depicts an apparatus for reproducing the scene captured by the apparatus of FIG. 12. A plurality of projectors, a flat screen, a viewing mirror and a revolving slit drum are employed.

The same number, n, of projectors 183 is employed as were cameras in FIG. 12. Each projector is comprised of a light source 184, a reflector 185 for the same, a condensing lens, 186, a planar transparency 187 and an objective lens 188. The condensing lens concentrates the light from the lamp upon the transparency. Each of the objective lenses are disposed on an arc 189, which arc has the same radius as arc 181 of FIG. 12, and over the same length of arc, angularly designated by $\theta$.

Each of the projectors forms a focused image of the scene from the transparency thereof upon horizontally positioned translucent screen 190. These images are sequentially projected, from projectors 1, 2, 3, 4, . . . n, and are repeated within 1/16 second or less.

Sequential projection is accomplished by a shutter on each projector, such as shutter 191 on projector "n." This may be of the revolving type with each shutter suitably phased to give the sequential projection required and each driven by synchronous motors from a common power source, or each shutter may be operated with an electrical relay, with the group sequentially timed by a series of electrical pulses.

As control of image projection sweeps sequentially across the parallel array of projectors because of the operation of the shutters, the angle substended by the side extremities of the images on the flat screen 190 at the corresponding projector lens is equal for all projectors and the optics is adjusted to bring each perspective in focus on the screen and the intensity of each lamp is adjusted to give equal brightness for each image on the screen.

Consonant with prior embodiments of my invention, a slotted drum 194 is employed for viewing. This is always a multi-slot drum for this type of embodiment. The number of slots employed is determined by the quotient of 360° divided by $\theta$. Typically this may be 4; although any number may be provided for within practical limits. It is to be noted that a particular length of arc 181 in FIG. 12 and 189 in FIG. 13 is preferably chosen so that the quotient is an integer.

In FIG. 13 the slits are identified by reference 192. The position of a slit when the particular observer 193 is viewing the scene is directly in front of him and also for a short segment of traverse before and after passing center. The position of a slit in the exact center is shown dotted as 192′ in FIG. 13.

The speed of revolution of drum 194 follows the same criteria previously set forth; for four slits this is 4 revolutions per second. The drum is revolved by means previously disclosed.

The viewing mirror 195 is best seen in FIG. 14. It is inclined at an angle of the order of 45° so that the image appearing upon stationary horizontal screen 190 will be visible through the slits to the typical observer 193. He sees the image as though it was vertically disposed, as at 196.

It is to be noted in passing that my method and apparatus of FIG. 12 employs cameras disposed parallel one to the other and not converging to a common center, as was proposed early in the art. Also, my reproducing apparatus according to the method of my invention shown in FIGS. 13 and 14 employs my characteristic revolving slitted drum and further, the multiple projectors are preferably disposed vertically.

In previous embodiments the observers viewed the stereoscopic image by surrounding the apparatus that reproduced the image. I choose to call these "convexed systems."

FIG. 15 shows the essential otpical representation for a system of cameras for capturing stereoscopic views for reproduction by a reverse arrangement; the apparatus which reproduces the views surrounsd the observers, at least in the significant optical aspects. This I call a "concaved system."

For mass audiences at least, the concaved system provides the more startling and natural reproduction in that the whole retina of the observer's eyes are presented with visual material.

In FIG. 15, plural stationary cameras 200, 201, 202, etc., similar to the plural cameras of FIG. 12 are employed, except that in FIG. 15 each of these picks up a diverging view by being disposed with its optical axis along a radial of the arc along which the several cameras are arranged. Each camera is here represented in an elementary fashion by an objective lens, as 203, and a sensitive plate or equivalent surface, as 204, disposed behind the lens in each instance and at a smaller radius than that for the lenses.

In FIG. 15 the field of view is denoted by reference 205 (and/or an object within it). This may extend to infinity as indicated, in the usual photographic sense of the word. Each camera is separated from its neighbor by an angular increment of the order of 1.5°, as before. The sum of the angles forms an angle designated as B for identification. The view captured by each camera is indicated by a typical case at 206.

FIG. 16 shows the essentials in a plan view of the reproducing apparatus for my concaved embodiment. The audience is positioned within a central area. The individual observer 208 is representative of the audience and the boundary line 209 indicates the extent to which members of the audience can be accommodated.

A plurality of individual projectors are disposed radially outward equal in number to the cameras 200, etc., of FIG. 15 and having the same incremental angular separation and total arcuate extent B as previously described in connection with FIG. 15. These preferably surmount the drum of slits as seen in the practical embodiment of FIG. 19. The projectors are identified by the elements; the light source 210, condensing lens 211, transparency made with the camera in the corresponding position in FIG. 15, 212, and the objective lens 213.

A screen 214 surrounds the whole apparatus and audience. This is shown only in part of the whole circumference in FIG. 16, corresponding to the arc occupied by the projectors shown. The circumferential extent of the contribution of one projector to the composite image upon screen 214 is indicated at 215.

The drum of slits is circumferentially represented at 216. The drum has a number of slits inversely related to the angular extent of the angle B, as before. In FIG. 16 B is equal to 90° and the number of slits 217 is four.

The distance from the projectors to the screen is determined by projecting an object of known size onto the screen and observing the top and bottom extent of the image of the object upon the screen. This observation is made while looking through one of the vertical slits 217 from the audience area. The angle subtended at the eye of the observer is arranged to be equal to that subtended by the real object (in FIG. 15) at the same distance from object to observer.

In the reproduction process, the images of the transparencies 212, etc., are flashed upon screen 214 in succession as a slit 217 coincides in circumferential position with the projection lens 213 involved. The image is retained on the screen while the slit makes the circumferential travel from half-way between the lens in question and the location of the next lens to the left to half-way between the lens in question and the location of the next lens to the right. This is a distance of travel, of course, equal to the separation between successive lenses.

Flashing the images upon the screen is accomplished by shutter blades attached to the drum. These blades travel around circumferential path 218. This path preferably lies between the illuminating means and the transparencies so that the known heat of the former will not deteriorate the latter.

FIG. 17 shows a four facet camera for capturing pictures of the concaved type. An object in the field of view is 220, which field of view, however, extends all around the central point of the apparatus. Each of the lenses 222 are relay lenses acting in conjunction with the objective lenses 221; forms an individual camera optical system. Each system forms an image at each of the centrally located sensitive plates 223 (or equivalently progressed strips of film).

In taking pictures the operator positions the cross 224 of four cameras at an index mark upon protractor 225 and takes four pictures simultaneously, one in each camera. The camera cross is then rotated to the next index mark and the process is repeated.

It is also possible to move the camera cross continuously in a circle while a vertical slit shutter moves across each film width in 1.5° (approx.) increments. The vertical slit is made to move across the field of view while the camera moves continuously over 1.5°. Then the lens is scanned by another slit while the camera continues to move. In this manner the film-plate is prevented from receiving overlapping picture information. The camera lens is in constant motion and a quasi-picture is formed for each 1.5° increment.

FIG. 18 shows a four facet apparatus in plan view for reproducing the pictures captured by the camera of FIG. 17.

A central source of illumination 227 is provided at the center of rotation of projector cross 228. Four transparencies 229 surround source 227 in the respective positions that they were photographically produced in the taking camera. Light that has passed through each transparency is collected by the corresponding relay lens 230 and is passed on to the corresponding objective lens 231 for projection by each of the four projector entities.

Actually, in practice, each of the transparencies 227 is comprised of a series of 240 transparencies (one for each 1.5°). Only one is exhibited at any one time but these are changed by a known intermittent film motion to the next transparency for each increment of revolution of the projector cross of 1.5° in the projection process. Each loop of the four may be identical, but the same are advanced in phase by an amount 360/n. In the present illustrations n=4, thus the film loops are advanced 90°, one with respect to the other.

The projector 228 is preferably rotated at 16/n revolutions per second, i.e., 4 revolutions per second in the present embodiment. The images are formed sequentially in time and in space upon cylindrical screen 232.

This configuration is embodied practically as shown in the elevation view of FIG. 19. The projector cross is generally indicated in the top center part of the working volume by 228'. A translucent screen 232' surrounds the same at the same elevation, as shown. Behind this screen is located the upper part of a curved 90° "book of mirrors" 234; or, more generally, there may be "n" books which rotate along with the slit drum. In 90° relation below the upper part of the book is located the lower part, 235. Various members 236 of an audience are located below the projector cross and within the radial limits of screen 232. Between the audience and the lower mirror 235 is slitted drum 237. In FIG. 19 slits one and three are at the left and at the right extremities of the drum at the instant chosen. The audience sees the presentation centered about virtual screen 238 in stereoscopic depth, which extends from the radius of the slit drum 237 to infinity.

Means to rotate drum 237 are located below the audience area and follow the embodiments previously described, but on a larger scale.

In FIG. 18 the equivalent of vertically slitted drum 237 of FIG. 19 is seen as the circle below plural lenses 231. The slits thereof and drum are sufficiently below each lens 231 so that the image emerging from each lens is not obstructed.

We now turn to certain representations of images as these exist at various points in the embodiments presented to most easily allow my stereoscopic method to be understood.

FIG. 20 shows the appearance of a portion of a film strip taken with the camera of FIG. 4.

For reference the frames are labelled from A to G from right to left. The object captured from the field of view is a vertical arrow and appears thus when reproduced by my reproducer of FIG. 5. The arrow is chosen as a convenient directional symbol, but the scene captured may include numerous objects and such objects at different stereoscopic distance.

In FIG. 20 it will be noted that in the progression from frames A through G the arrow experiences a clockwise rotation and a motion within the frame off toward the left. Unexpected as it may seem, this transparency image is reconstituted to an upright arrow for all positions in which the observer can see the arrow. This allows him to look all around it, after which it passes from his field of view and other objects take its place as he walks around the stereoscopic display.

With the camera of FIG. 6 the arrow would remain in the center of each frame and merely rotate. This compensates for the rotation of the drum in the reproducing apparatus.

In placing a film loop upon a drum in drum type playback apparatus, such as those of FIGS. 5, 7, etc. the criterion illustrated in FIG. 21 must be observed. The construction is such that the internal mirror 46 slants away from the top of the slit 47. The image is seen upon translucent screen 45 and consists of an arrow 240 with a small lower tail and a cross line. The base of the arrow, as extended, must pass through slit 47, or at least be parallel to the direction shown by this example. The plane (not shown) defined by the arrow image upon screen 45 and the slit 47 must be at right angles to internal mirror 46. As shown, the base of the arrow is toward the slit and the top thereof is toward the top of the internal mirror.

In FIG. 22 a series of typical images of an arrow object are given for the reproducer of FIG. 7. The two film loops 74 and 75 have previously been captured by the camera arrangement of FIG. 6, developed, etc. to give positive transparency prints. These may be in color or in black and white. In FIG. 22 all mechanical and light-producing details have been omitted for clarity.

The orientation of the images upon the film loops 74 and 75 are shown upon imaginary screens 244 and 245. It is seen that the images are upside-down, one to the other. The images resulting after reflection from prisms 88 and 91 are seen on imaginary screens 246 and 247. Continuing the ray tracing, the images resulting after reflection from mirrors 89 and 92 are seen on imaginary screens 248 and 249. It will be understood that real images are formed upon real screens 86 and 87 by lenses 84 and 85. The images on the "imaginary screens" are actually not formed, but this analysis is given to allow the optics to be followed through my device.

Book of mirrors 92 reverses the image incident upon it in a direction transverse to the common intersection of these two mirrors, but merely reflects in the direction parallel to this intersection.

Continuing both optical paths, the images resulting at reflection at mirrors 90 and 93 are seen on imaginary screens 250 and 251. The real images formed upon real screens 86 and 87 are shown on these screens. The point of the arrow on screen 86 points away from slit 96 in accordance with the criterion of FIG. 21. Because double mirror 94 slants in the opposite direction of the arrow image on screen 87, this arrow is also erected with point upward for viewing through slit 97 by a second observer at the particular instant chosen for the drawing.

While exemplary embodiments for carrying out the method of my invention have been given it will be understood that certain modifications may be made in the examples given.

In forming the "permanent" record employed for the transparencies it will be understood that these records are merely permanent in the usual meaning of the term and that they are not ordinarily transient images such as might be formed upon a non-retentive projection screen or upon a fluorescent screen.

It will also be understood that a permanent record may be made by means other than by conventional photography, including the production of pictures by electrostatic or heat means. While transparencies are preferred, images may also be taken by reflection from opaque records.

It is also to be noted that while the usual diaphram type shutter has been most prominently set forth as a means to obtain an exposure of a stationary image even through the camera might be in motion it is also possible to obtain the same image with a very narrow slit type exposing shutter which moves over the sensitive plate while the camera as a whole is also moving over the scene to be photographed.

While four "spokes" in the configuration of a cross have been shown in FIG. 17 it is possible to have a different number of spokes as long as the capturing and the reproducing apparatti have the same number.

Various types of shutters may, of course, constitute "obdurating" means.

In FIG. 19, rather than the relay optics shown, fiber optics may be employed. In the latter, the light for the many elemental parts of an image is separately conveyed from one plane to another (which may be quite far removed) through lucite-like solid light-transmitting materials.

Still other modifications may be made in the arrangement, size, proportions and shape of the illustrative embodiments shown without departing from the scope of my invention.

Having thus fully described my invention and the manner in which it is to be practiced, I claim:

1. A system for reproducing stereoscopic views for observation by plural observers, in the absence of visual aids at the eyes of said observers, comprising;
   (a) first plural means for forming permanent plural image records in number greater than two of a view to be stereoscopically reproduced, having
   (b) second means for positioning each of said first plural means at different circumferential positions around the center of a unified location of said plural image records for radially accepting an image of said view, and
   (c) third means for rotating said first and second means together around said center of the location of said plural image records;
   (d) fourth plural means equal in number to the plurality of said first plural means, for radially projecting visible images from said plural image records, having
   (e) fifth means for positioning each of said fourth plural means at different circumferential positions around the center of a unified location of said plural image records corresponding to the said different circumferential positions of said second means,
   (f) sixth means for rotating said fourth and fifth means together around said center of the location of said plural image records,
   (g) a screen surrounding said fourth means for receiving an unobstructed image projected from said plural image records, and
   (h) an essentially opaque member in front of said screen, said member having means for traversing said screen with plural narrow vertical transparent portions,
whereby said stereoscopic views are revealed through the transparent portions of said opaque member to an observer who views said screen through the transparent portions of said opaque member.

2. The system for reproducing stereoscopic views of claim 1 in which said first plural means includes;
   (a) an objective lens for each of said first plural means positioned upon a common circumferential locus,
   (b) image-sensitive means for each of said first plural means positioned substantially at the center of said circumferential locus to receive an image from the view taken by the corresponding objective lens,
   (c) means to cause incremental rotation of said objective lenses and said image-sensitive means about said center of said circumferential locus, and (d) means to expose said image-sensitive means to a different whole view taken by an objective lens at each said incremental position.

3. The system for reproducing stereoscopic views of claim 1 in which said first plural means includes;
(a) an objective lens for each of said first plural means positioned upon a common circumferential locus,
(b) image-sensitive means for each of said first plural means positioned substantially at the center of said circumferential locus to receive an image from the view taken by the corresponding objective lens,
(c) a slit shutter,
(d) a said third means to effect continuous rotation, and
(e) means to move said shutter across said image-sensitive means while said third means effects continuous rotation,
to record separate incremental areas of said view to be stereoscopically reproduced.

4. The system for reproducing stereoscopic views of claim 1 in which said opaque member comprises;
(a) an opaque drum having a number of vertical slits equal in number to the number of said fourth plural means, and
(b) seventh means for rotating said opaque drum synchronously with said sixth means.

5. The system for reproducing stereoscopic views of claim 1 in which;
(a) support means position said opaque member approximately half way between said screen and a said observer.

6. The system for reproducing stereoscopic views of claim 1 in which;
(a) each of said first plural means has a radially disposed optical system for forming a said image record of a portion of the whole of the view to be stereoscopically reproduced, and
(b) each of said fourth plural means has a radially disposed optical system for reproducing from said image record the same portion of the whole of the said view to be stereoscopically reproduced.

7. The system for reproducing stereoscopic views of claim 6 in which the said optical system of each said first plural means includes;
(a) an objective lens,
(b) relay lens means, and
(c) eighth means to support said relay lens means between said objective lens and said location of said plural image records.

8. The system for reproducing stereoscopic views of claim 1 in which said screen is translucent and which additionally includes;
(a) reflective means circumferentially beyond said translucent screen to reflect said views to plural observers occupying a position below said fourth plural means.

9. The system for reproducing stereoscopic views of claim 1 in which the plurality of only said first plural means is reduced to one and which additionally includes;
(a) plural copies of said permanent image record equal in number to the original plurality of said fourth plural means and formed by said one first plural means, and
(b) further means to position each said copy within each said fourth plural means at an optical image phase of the view to be reproduced corresponding to the circumferential location of that said fourth plural means.

References Cited

UNITED STATES PATENTS

| | | | |
|---|---|---|---|
| 705,771 | 7/1902 | Lumiere | 352—70 |
| 1,950,374 | 3/1934 | Kanolt | 95—18 |
| 1,977,310 | 10/1934 | Kanolt | 95—18 |
| 2,175,114 | 10/1939 | Friedmann | 95—18 |
| 2,441,674 | 5/1948 | Savoye | 352—65 |
| 2,596,740 | 5/1952 | Tuttle | 95—36 |
| 2,599,454 | 6/1952 | Hudeley | 95—18 |
| 3,223,009 | 12/1965 | Kapany | 352—84 |

JOHN M. HORAN, *Primary Examiner.*